United States Patent [19]

Asa et al.

[11] Patent Number: 5,716,108
[45] Date of Patent: Feb. 10, 1998

[54] BRAKING FORCE CONTROL SYSTEM OF ELECTRIC VEHICLE

[75] Inventors: Hironori Asa, Okazaki; Tomoyuki Gotoh, Anjo; Kenji Takeda, Okazaki, all of Japan

[73] Assignee: Nippon Soken, Inc., Nishio, Japan

[21] Appl. No.: 534,698

[22] Filed: Sep. 27, 1995

[30] Foreign Application Priority Data

Sep. 28, 1994 [JP] Japan ................................. 6-258732

[51] Int. Cl.$^6$ ................................................. B60T 13/74
[52] U.S. Cl. ............................ 303/3; 303/152; 188/156
[58] Field of Search ................................. 303/151, 152, 303/3, 15; 188/156; 180/65.1, 165

[56] References Cited

U.S. PATENT DOCUMENTS

| | | | |
|---|---|---|---|
| 4,671,577 | 6/1987 | Woods | 303/152 X |
| 5,294,191 | 3/1994 | Giorgetti et al. | 303/152 X |
| 5,378,053 | 1/1995 | Patient et al. | 303/152 X |
| 5,573,312 | 11/1996 | Muller et al. | 303/151 X |

FOREIGN PATENT DOCUMENTS 5-176407  7/1993  Japan .

*Primary Examiner*—Peter M. Poon
*Attorney, Agent, or Firm*—Cushman, Darby & Cushman IP Group of Pillsbury, Madison & Sutro LLP

[57] ABSTRACT

A braking force control system of an electric vehicle includes a regenerative-controllable motor for driving driven wheels, wheel cylinders for braking non-driven wheels, respectively, and a master cylinder connected to a brake pedal for producing a master cylinder pressure in proportion to a depression amount of the brake pedal. A mechanical braking force control unit is further provided in a working fluid passage from the master cylinder and the wheel cylinders. The mechanical braking force control unit includes a proportioning valve and a free-piston cylinder arranged in parallel with each other in the working fluid passage. The proportioning valve is operated to output a wheel cylinder pressure to the wheel cylinders when the depression amount of the brake pedal is no more than a given value. On the other hand, the free-piston cylinder is operated to output a wheel cylinder pressure to the wheel cylinders when the depression amount of the brake pedal is more than the given value. A motor control unit is further provided to perform a regenerative control of the motor for achieving a regenerative braking force which is equal to a difference between a target total braking force derived based on the depression amount of the brake pedal and a mechanical braking force derived based on the wheel cylinder pressure outputted from the mechanical braking force control unit.

5 Claims, 8 Drawing Sheets

BRAKING FORCE CONTROL SYSTEM OF ELECTRIC VEHICLE

BACKGROUND OF THE INVENTION

1. Field of the Invention

The present invention relates to a system for controlling a braking force of an electric vehicle, and more specifically, to a braking force control system of an electric vehicle which aims to improve an operation feeling or operationability of a brake pedal.

2. Description of the Prior Art

In the electric vehicle, a regenerative control of an electric drive motor is performed to obtain a braking force and further to recharge a battery.

As shown in FIG. 11, in a range of a brake-pedal actuation or depression amount being small, a regenerative braking force produced by the motor is increased in proportion to the brake-pedal depression amount. On the other hand, after the motor achieves its maximum regenerative braking torque or force, a mechanical braking force, such as a hydraulic braking force, produced by wheel cylinders is gradually increased depending on increment of the brake-pedal depressing amount while the maximum regenerative braking force of the motor is maintained. Accordingly, as shown in FIG. 11, it is ideal to achieve a total braking force Fb which is proportional to the brake-pedal depression amount, in light of ensuring the excellent brake-pedal operation feeling.

As is known, in the regenerative control of the motor, when a speed of the motor is decreased below a given value, the motor can not achieve its maximum regenerative braking force so that the regenerative braking force is decreased as shown in FIG. 12. Thus, as shown in FIG. 13, when a speed of the vehicle is lowered like just before the vehicle stops, the regenerative braking force is reduced so that a brake-pedal depression amount necessary for achieving a total braking force Fb1 is increased from m1, which is required during the normal running of the vehicle, to m2. This may deteriorate the brake-pedal operation feeling.

For improving this drawback, Japanese First (unexamined) Patent Publication No. 5-176407 discloses a braking force control system, wherein a solenoid valve is opened to directly apply a pressure in a master cylinder to wheel cylinders when a motor speed is dropped below the foregoing given value, so as to perform braking of the vehicle by means of the mechanical braking force.

However, in the disclosed control system, the solenoid valve, that is, an electrically operated valve is used for changing the control characteristic. Accordingly, operation failure is possible to occur due to, for example, disconnection to open circuit or the like so that reliability of the system is not ensured.

Further, even during the normal running of the vehicle where the motor speed is high enough, a linear relationship between the brake-pedal depression amount and the total braking force is not guaranteed in the conventional techniques. This may also deteriorate the brake-pedal operation feeling.

SUMMARY OF THE INVENTION

Therefore, it is an object of the present invention to provide an improved braking force control system of an electric vehicle.

According to one aspect of the present invention, a braking force control system of an electric vehicle having a wheel driven by a regenerative-controllable motor and a wheel provided with a wheel cylinder which is operated in response to a braking pressure from a master cylinder connected to a brake pedal, comprises wheel cylinder pressure output means for outputting to the wheel cylinder a wheel cylinder pressure, as the braking pressure, by reducing a master cylinder pressure from the master cylinder at a constant rate when a depression amount of the brake pedal is no more than a given value, the master cylinder producing the master cylinder pressure in proportion to the depression amount of the brake pedal, and for outputting to the wheel cylinder the wheel cylinder pressure, as the braking pressure, which increases at a given rate relative to the master cylinder pressure when the depression amount of the brake pedal is more than the given value; and regenerative braking control means for performing a regenerative control of the motor so as to achieve a regenerative braking force which is equal to a difference between a target total braking force derived based on the depression amount of the brake pedal and a mechanical braking force derived based on the wheel cylinder pressure outputted from the wheel cylinder pressure output means.

According to another aspect of the present invention, a braking force control system of an electric vehicle comprises a regenerative-controllable motor for driving a wheel; a wheel cylinder for braking a wheel; a master cylinder connected to a brake pedal for producing a master cylinder pressure in proportion to a depression mount of the brake pedal; wheel cylinder pressure output means, provided in a working fluid passage from the master cylinder and the wheel cylinder, for receiving the master cylinder pressure from the master cylinder, the wheel cylinder pressure output means outputting to the wheel cylinder a wheel cylinder pressure which increases at a first given rate, being less than 1, relative to the received master cylinder pressure when the depression mount of the brake pedal is no more than a given value, and the wheel cylinder pressure output means outputting to the wheel cylinder the wheel cylinder pressure which increases by an increment value, the increment value increasing at a second given rate, being greater than the first given rate, relative to an increment value of the master cylinder pressure, when the depression mount of the brake pedal is more than the given value; means for deriving a target total braking force based on the depression amount of the brake pedal; means for deriving a mechanical braking force based on the wheel cylinder pressure outputted from the wheel cylinder pressure output means; and regenerative braking control means for performing a regenerative control of the motor so as to achieve a regenerative braking force which is equal to a difference between the derived target total braking force and the derived mechanical braking force.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

[First Embodiment]
Structure of Braking Force Control System

Figure 1:
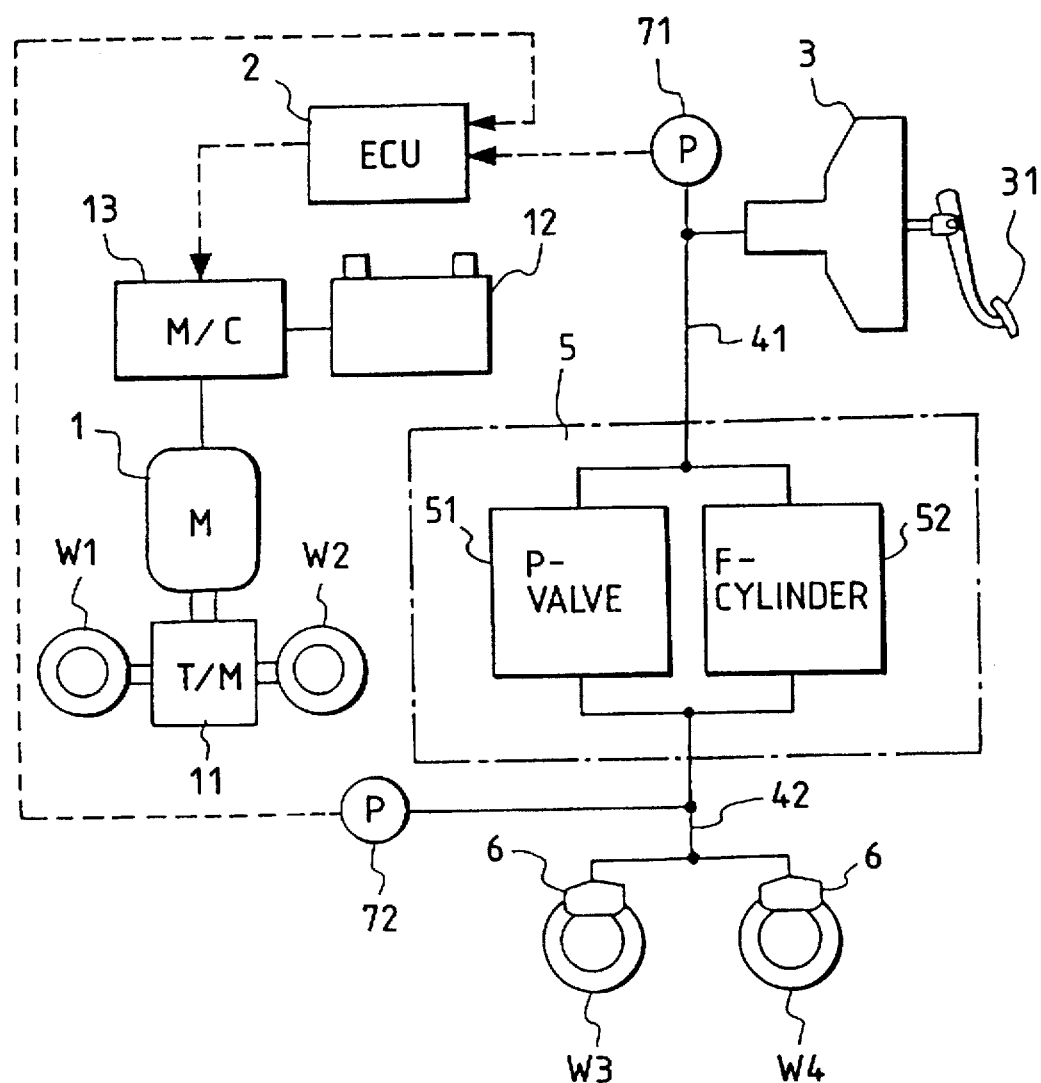
FIG. 1 is a block diagram showing the overall structure of a braking force control system of an electric vehicle according to a first preferred embodiment of the present invention.

FIG. 1 shows the overall structure of a braking force control system of an electric vehicle according to a first preferred embodiment of the present invention.

In FIG. 1, left and right driven wheels W1 and W2 of the vehicle are driven by an electric motor 1 through a transmission 11. An operation of the motor 1 is controlled by a motor control unit 13, as regenerative braking control means, which is fed with power from a battery 12. For example, when an induction motor is used as the motor 1, the motor control unit 13 controls the primary current of the motor 1 to change a torque of the motor 1 to be generated. The motor control unit 13 switches between a drive control of the motor and a regenerative control of the motor according to a command from an electronic control unit (hereinafter referred to as "ECU") 2.

Numeral 3 denotes a master cylinder coupled to a brake pedal 31 for generating a braking pressure depending on a brake-pedal actuation or depression amount. The master cylinder 3 communicates with wheel cylinders 6, 6 of left and right non-driven wheels W3 and W4 via oil piping 41, a mechanical braking force control unit 5, as wheel cylinder pressure output means, and oil piping 42. The mechanical braking force control unit 5 is composed of a proportioning valve (hereinafter referred to as "P-valve") 51 and a free-piston cylinder (hereinafter referred to as "F-cylinder") 52 connected in parallel with each other in the piping 41 and 42, which will be described later in detail. Further, pressure sensors 71 and 72 are provided in the piping 41 and 42 upstream and downstream of the mechanical braking force control unit 5, respectively. The pressure sensors 71 and 72 monitor a pressure generated in the master cylinder 3 (hereinafter also referred to as "master cylinder pressure") and a pressure applied to the wheel cylinders 6, 6 (hereinafter also referred to as "wheel cylinder pressure"), respectively, and input them to the ECU 2.

Structure and Operation of P-Valve

Figure 2:
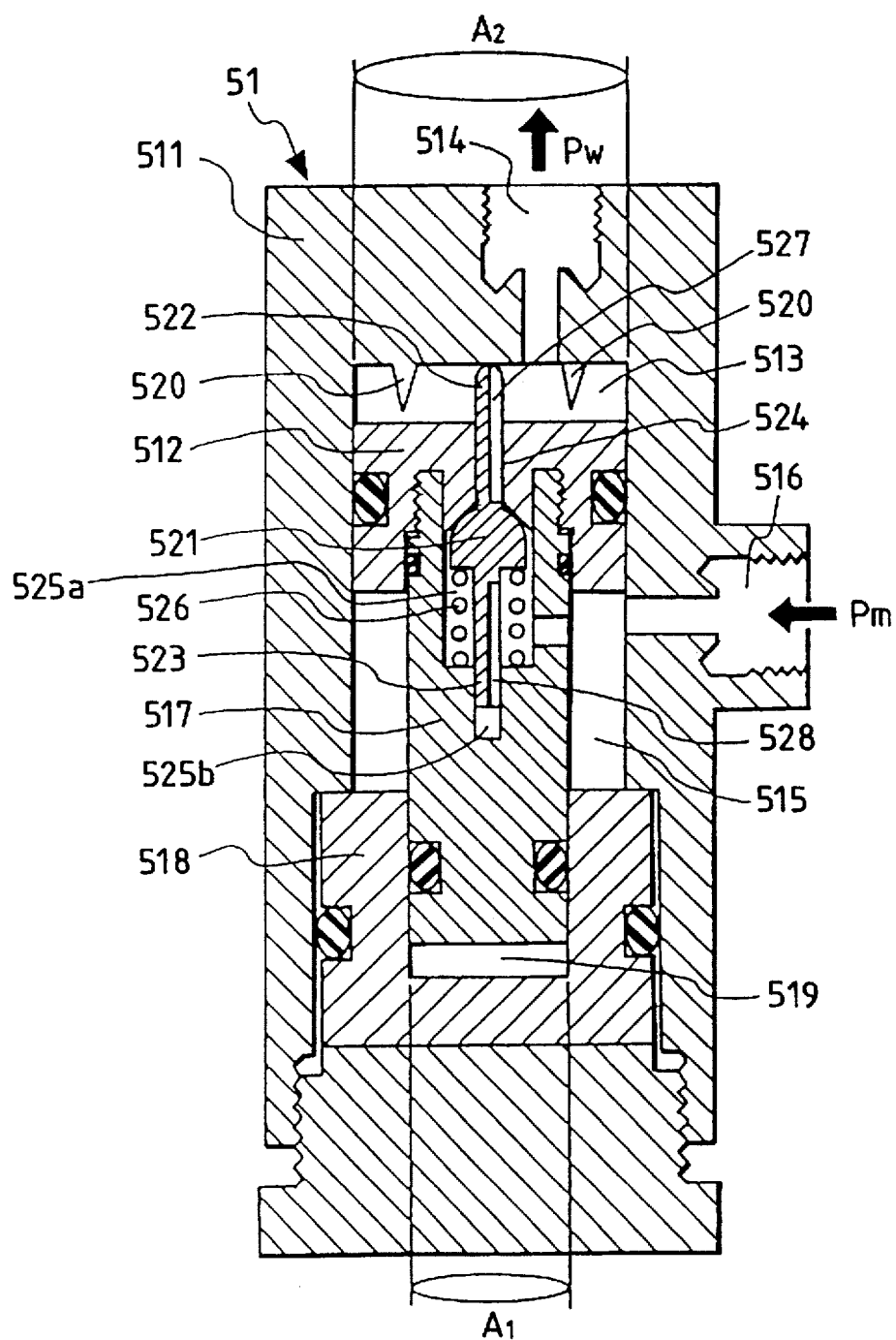
FIG. 2 is a vertical sectional view showing the overall structure of a proportioning valve incorporated in the braking force control system shown in FIG. 1.

FIG. 2 shows a detailed structure of the P-valve 51. In the figure, numeral 511 denotes a cylindrical hermetic housing in which a piston 512 is disposed to define upper and lower chambers in the housing 511. The upper chamber located above the piston 512 is a wheel-cylinder pressure chamber 513 which communicates with the wheel cylinders 6, 6 of the non-driven wheels W3 and W4 via the piping 42 (see FIG. 1) connected to an output port 514 of the housing 511. On the other hand, the lower chamber located below the piston 512 is a master-cylinder pressure chamber 515 which communicates with the master cylinder 3 via the piping 41 (see FIG. 1) connected to an input port 516 of the housing 511.

A rod 517 is arranged in the housing 511 below the piston 512. The rod 517 has an upper end fixed to the piston 512 and a lower end slidably received in an atmospheric-pressure chamber 519 formed in a rod housing 518. With this arrangement, the piston 512, along with the rod 517, is vertically movable within a short distance defined between projections 520, 520 formed on a top inner wall surface of the housing 511 and a bottom of the atmospheric-pressure chamber 519.

An upper end portion of the rod 517 is formed at its center with a stepped recess having a large-diameter portion 525a and a small-diameter portion 525b. The stepped recess includes therein a valve element 521. The valve element 521 has upward and downward elongate extensions 522 and 523 at the centers of vertically opposite ends thereof, respectively. The upward extension 522 passes through a hole 524 formed through the center of the piston 512 and protrudes into the wheel-cylinder pressure chamber 513. On the other hand, the downward extension 523 of the valve element 521 is received in the small-diameter portion 525b of the stepped recess. Further, the valve element 521 is urged upward by a coil spring 526 disposed in the large-diameter portion 525a of the stepped recess. In the state shown in FIG. 2, the valve element 521 is pressed on a valve seat formed around a lower end of the through-hole 524 of the piston 512 so as to close the through-hole 524. Numerals 527 and 528 denote vertical oil grooves provided on the upward and downward extensions 522 and 523, respectively, for allowing oil to flow therealong.

The P-valve 51 having the foregoing structure operates as follows:

When a master cylinder pressure Pm is applied to the P-valve 51 at the input port 516, the piston 512 moves upward until it abuts against the projections 520, 520. In this state, since the valve element 512 is prohibited from moving upward due to its upward extension 522 being in contact with the top inner wall surface of the housing 511; the through-hole 524 is opened so that oil flows into the wheel-cylinder pressure chamber 513 from the master-cylinder pressure chamber 515. Subsequently, since a pressure-receiving area of the piston 512 is smaller at a side of the master-cylinder pressure chamber 515 than at a side of the wheel-cylinder pressure chamber 513, the piston is then pushed downward so that the through-hole 524 is again closed by the valve element 521.

The pressure balance across the piston 512 is achieved and expressed by an equation (1) as follows:

$$(A2 - A1) \times Pm = A2 \times Pw \quad (1)$$

$$Pw = \frac{(A2 - A1)}{A2} \times Pm$$

wherein Pw represents a wheel cylinder pressure, A1 a sectional area of the atmospheric-pressure chamber 519, A2 a sectional area of the wheel-cylinder pressure chamber 513, and Pm a master cylinder pressure.

Figure 3:
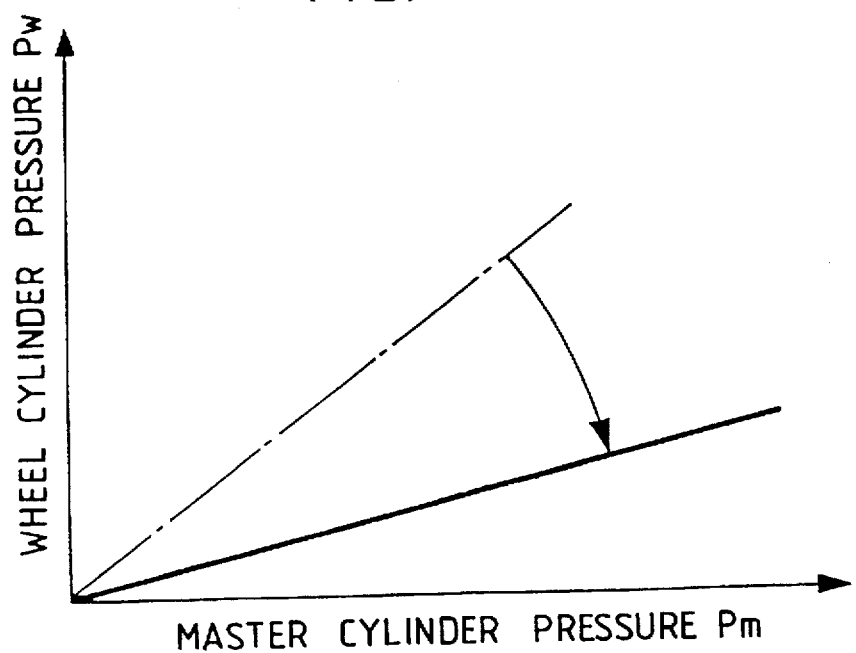
FIG. 3 is a diagram showing a pressure characteristic of the proportioning valve shown in FIG. 2, in terms of a master cylinder pressure and a wheel cylinder pressure.

Since a pressure gradient K1=(A2−A1)/A2<1, the wheel cylinder pressure Pw which is an output of the P-valve 51 becomes a value which is achieved by reducing the master cylinder pressure Pm at a constant rate as shown in FIG. 3.

Structure and Operation of F-cylinder

Figure 4:
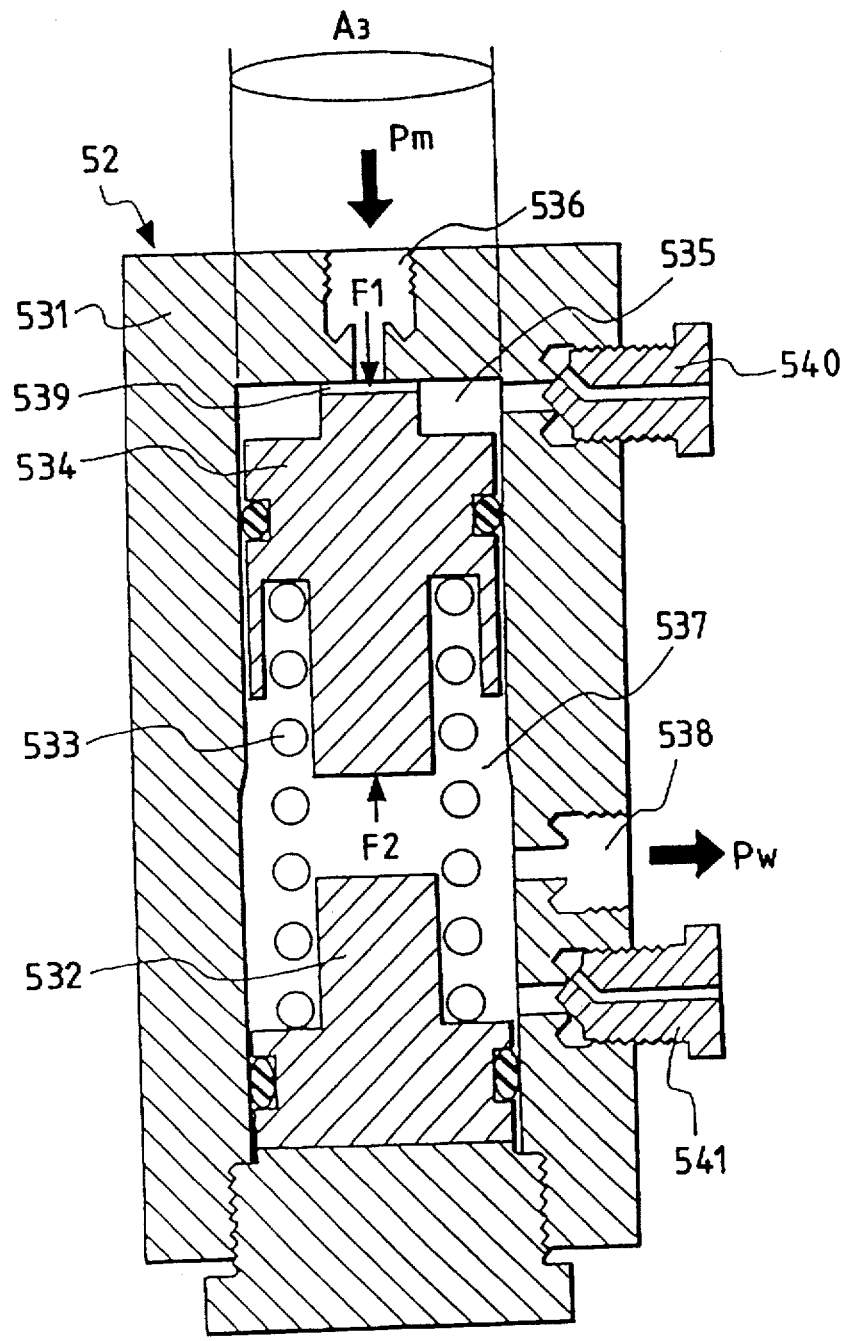
FIG. 4 is a vertical sectional view showing the overall structure of a free-piston cylinder incorporated in the braking force control system shown in FIG. 1.

FIG. 4 shows a detailed structure of the F-cylinder 52. In the figure, numeral 531 denotes a cylindrical hermetic housing in which a piston 532 is disposed in contact with a bottom of the housing 531. A coil spring 533 is provided vertically between the piston 532 and a free piston 534 so as to bias the free piston 534 upward. In the state shown in FIG. 4, the free piston 534 is pressed against a top inner wall surface of the housing 531 due to a biasing force of the coil spring 533. The free piston 534 defines upper and lower chambers in the housing 531. The upper chamber located above the free piston 534 is a master-cylinder pressure chamber 535 which communicates with the master cylinder 3 via the piping 41 (see FIG. 1) connected to an input port 536 of the housing 531. On the other hand, the lower chamber located below the free piston 534 is a wheel-cylinder pressure chamber 537 which communicates with the wheel cylinders 6, 6 of the non-driven wheels W3 and W4 via the piping 42 (see FIG. 1) connected to an output port 538 of the housing 531.

On an upper end surface of the free piston 534 is formed an oil groove 539 for establishing communication between the input port 536 and the master-cylinder pressure chamber 535. Air venting for the pressure chambers 535 and 537 is achieved by loosening bleeders 540 and 541, provided at the circumferential wall of the housing 531, in an unscrewed direction, respectively.

The F-cylinder 52 having the foregoing structure operates as follows:

Since pressure-receiving areas of the free piston 534 at upper and lower sides thereof, that is, at a side of the master-cylinder pressure chamber 535 and at a side of the wheel-cylinder pressure chamber 537, are the same with each other, forces F1 and F2 acting on the free piston 534 at the upper and lower sides thereof, respectively, are expressed by equations (2) and (3) as follows:

$$F1 = Pm \times A3 \quad (2)$$

$$F2 = Fs + Pw \times A3 \quad (3)$$

wherein Pm represents a master cylinder pressure, Fs a spring force of the coil spring 533, Pw a wheel cylinder pressure, and A3 each of pressure-receiving areas of the free piston 534 at the upper and lower sides thereof.

Figure 5:
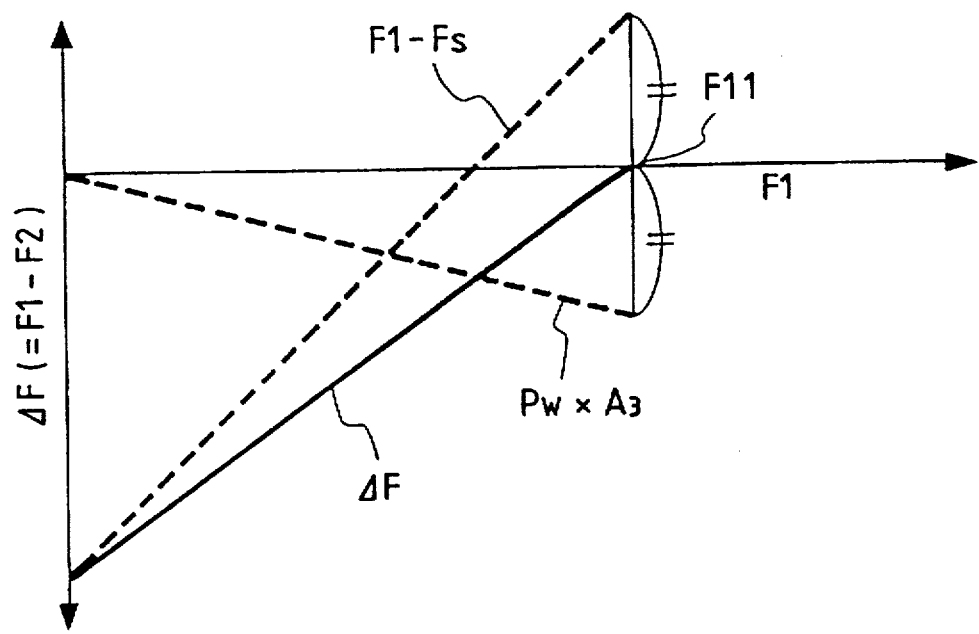
FIG. 5 is a characteristic diagram showing a relationship of forces applied to a free piston in the free-piston cylinder.

FIG. 5 shows a variation of a force difference ΔF (=F1−F2) between the forces F1 and 172 depending on increment of the force F1 (that is, the master cylinder pressure Pm) which presses the free piston 534 downward. In the figure, a force pressing the free piston 534 downward is set to be positive. As seen from FIG. 5, until the force F1 reaches a given value F11 (corresponding to a master cylinder pressure Pm1 in FIGS. 6 and 7), the force difference ΔF applied across the free piston 534 remains to be negative so that the free piston 534 does not move downward and maintains the state shown in FIG. 4 where the free piston 534 is pressed against the top inner wall surface of the housing 531. Thus, while ΔF is negative, the master cylinder pressure Pm at the input port 536 does not act upon the wheel cylinder pressure Pw at the output port 538.

On the other hand, when the force F1 exceeds the value F11, that is, when the master cylinder pressure Pm exceeds the value Pm1, ΔF becomes positive so that the free piston 534 starts moving downward depending on the master cylinder pressure Pm. Thereafter, in this embodiment, the wheel cylinder pressure Pw increases at the same rate as the master cylinder pressure Pm. More specifically, as seen from FIG. 6, the wheel cylinder pressure Pw increases by a value equal to an increment value of the master cylinder pressure Pm, or the wheel cylinder pressure Pw increases by a value which increases at a rate of "1" relative to an increment value of the master cylinder pressure Pm. While the master cylinder pressure Pm is above the value Pm1, the piston 512, including the valve element 521 and the rod 517, of the P-valve 51 is pressed and moved downward due to the wheel cylinder pressure Pw so that the through-hole 524 of the piston 512 is closed by the valve element 521.

Since Pm1 represents the master cylinder pressure Pm when ΔF becomes 0 (zero), the following equation (4) is derived based on the foregoing equations (1) to (3):

$$Pm1 = Fs/\{(1-K1) \times A3\} \quad (4)$$

Since the wheel cylinder pressure Pw is determined solely by the operation of the F-cylinder 52 while the master cylinder pressure Pm is above Pm1, it is given that:

$$Pw = Pm - Fs/A3 \quad (5)$$
$$= Pm - (1 - K1) \times Pm1$$

Operation of Braking Force Control System

Figure 6:
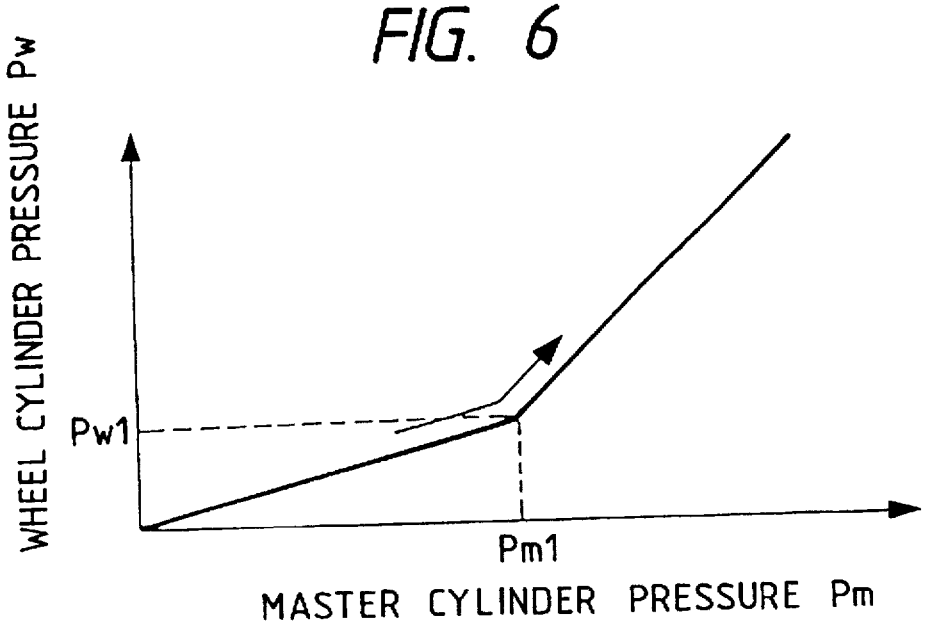
FIG. 6 is a diagram showing a pressure characteristic, in terms of a master cylinder pressure and a wheel cylinder pressure, of the braking force control system shown in FIG. 1 while the master cylinder pressure is increased.

By incorporating the mechanical braking force control unit 5 including the foregoing P-valve 51 and F-cylinder 52 which are connected in parallel with each other in the piping 41 and 42, a relationship between the master cylinder pressure Pm and the wheel cylinder pressure Pw during a depressing operation of the brake pedal 31 becomes as shown in FIG. 6. As appreciated, in the figure, Pw1=K1×Pm1.

Figure 7:
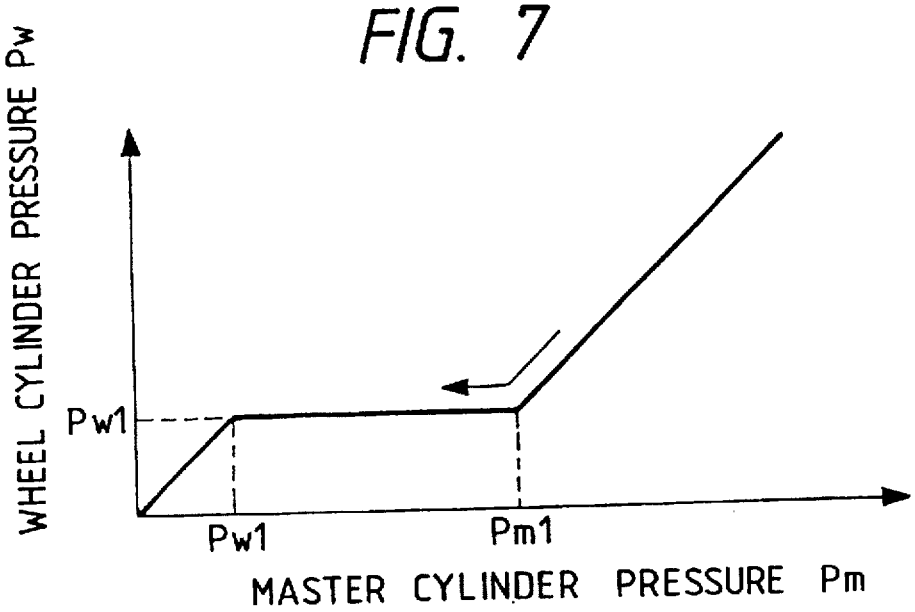
FIG. 7 is a diagram showing a pressure characteristic, in terms of a master cylinder pressure and a wheel cylinder pressure, of the braking force control system shown in FIG. 1 while the master cylinder pressure is decreased.

On the other hand, during a return operation of the brake pedal 31, the master cylinder pressure Pm decreases so that the wheel cylinder pressure Pw also decreases at the same rate up to Pw1 as shown in FIG. 7, and the free piston 534 returns to the top inner wall surface of the housing 531. Thereafter, the master cylinder pressure Pm further decreases. However, the valve element 521 of the P-valve 51 does not open the through-hole 524 of the piston 512 unless Pm<Pw. Accordingly, the wheel cylinder pressure Pw is maintained at Pw1 until the master cylinder pressure Pm is lowered to Pw1. After the valve element 521 opens the through-hole 524, the pressures Pm and Pw are both lowered to 0 (zero) while maintaining Pm=Pw. The opening timing of the through-hole 524 is adjustable by setting a spring force of the coil spring 526 to a different value.

Based on the foregoing wheel cylinder pressure Pw outputted from the mechanical braking force control unit 5, a mechanical braking force Fm is achieved as expressed by the following equation (6):

$$Fm = K3 \times Aw \times Pw \quad (6)$$

wherein K3 represents a brake effectiveness factor, and Aw a sum of sectional areas of the wheel cylinders 6, 6.

As described before, the excellent brake-pedal operation feeling can be achieved by prodding the total braking force Fb which is proportional or linear to the depression mount of the brake pedal 31, that is, the master cylinder pressure. As appreciated, the total braking force Fb is the sum of the mechanical braking force and the regenerative braking force of the motor.

Accordingly, the ECU 2 derives a target total braking force Fbt using the following equation (7):

$$Fbt = K2 \times Pm \quad (7)$$

wherein K2 represents a constant of proportion.

Further, in order to realize the derived target total braking force Fbt, the ECU 2 feeds a braking torque command to the motor control unit 13 to control the primary current of the motor 1 so that a regenerative braking force Fr of the motor 1 is achieved as expressed by the following equation (8):

$$\begin{aligned} Fr &= Fbt - Fm \\ &= K2 \times Pm - K3 \times Aw \times Pw \end{aligned} \quad (8)$$

Figure 8:
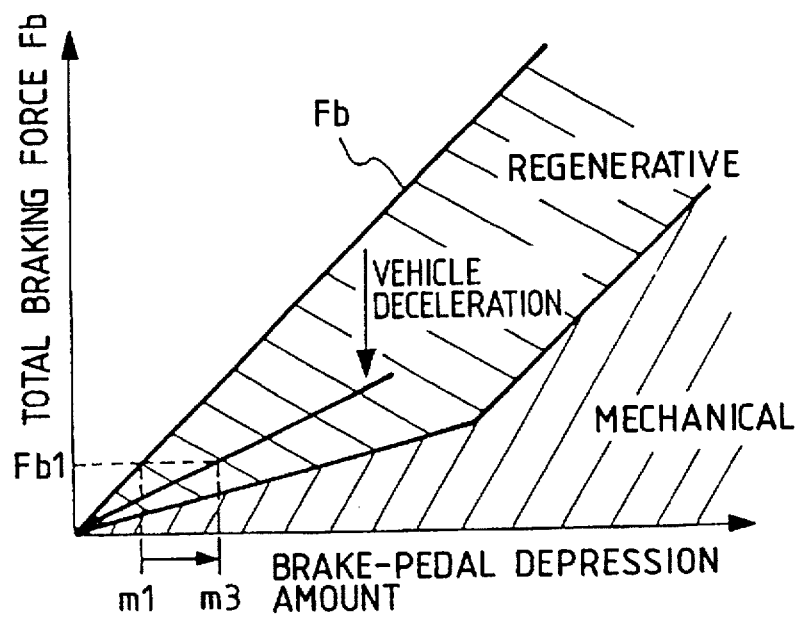
FIG. 8 is a diagram showing a braking force generation characteristic in terms of a brake-pedal depression amount and a total braking force including a regenerative braking force and a mechanical braking force, according to the braking force control system shown in FIG. 1.

By controlling the mechanical braking force Fm and the regenerative braking force Fr as in the foregoing manner, the total braking force Fb changes in proportion to the brake-pedal depression mount as shown in FIG. 8 so that the excellent brake-pedal operation feeling is ensured.

As also shown in FIG. 8, when a speed of the vehicle is lowered like just before the vehicle stops, the regenerative braking force Fr is reduced. However, since the mechanical braking force Fm is applied in all the range of brake-pedal depression amounts, a brake-pedal depression mount necessary for achieving a total braking force Fb1 is only increased from m1, which is required during the normal running of the vehicle, to m3 which is notably smaller than m2 required in the prior art. Accordingly, the brake-pedal operation feeling is improved as compared with the prior art.

Further, during the return operation of the brake pedal 31, the wheel cylinder pressure Pw is held at a relatively large value, that is, Pw1 in FIG. 7, while the master cylinder pressure is reduced from Pm1 to Pw1. Accordingly, a corresponding relatively large mechanical braking force Fm is achieved so that the vehicle can be reliably braked even when the regenerative braking force Fr becomes small due to deceleration of the vehicle.

[Second Embodiment]

Figure 9:
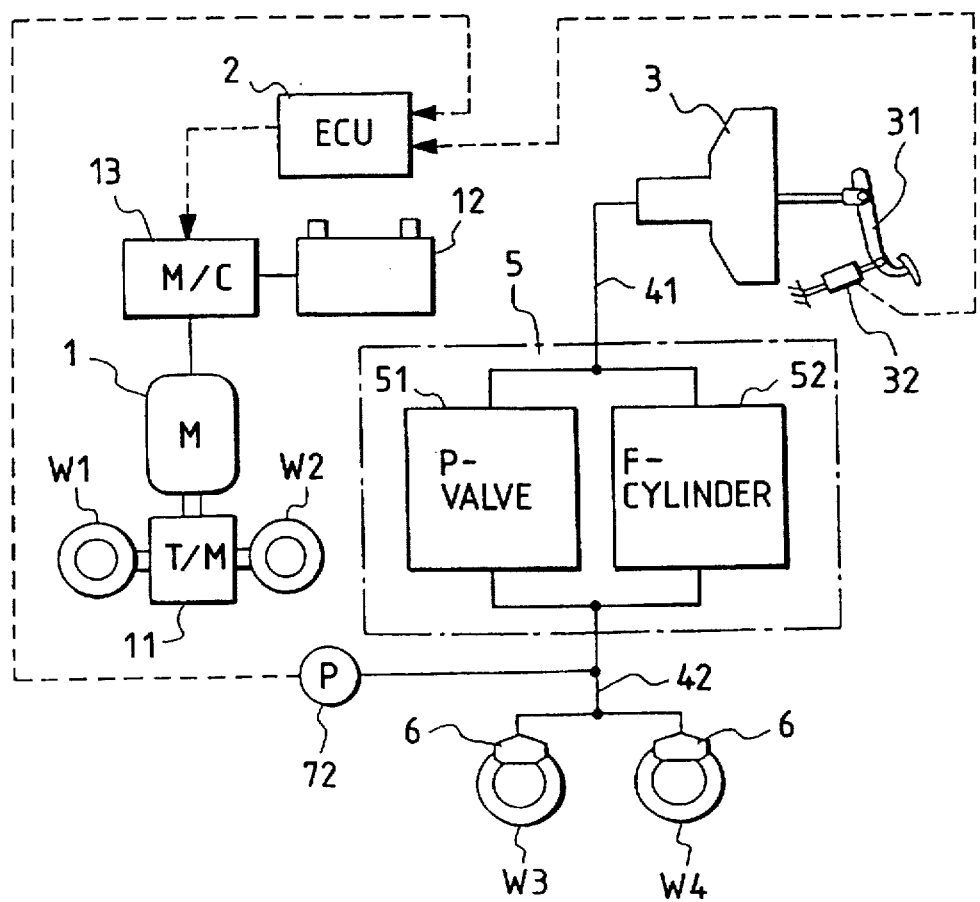
FIG. 9 is a block diagram showing the overall structure of a braking force control system of an electric vehicle according to a second preferred embodiment of the present invention.

FIG. 9 shows the overall structure of a braking force control system of an electric vehicle according to a second preferred embodiment of the present invention. In FIG. 9, the same or corresponding components are represented by the same symbols as those in FIG. 1.

In the foregoing first preferred embodiment, the master cylinder pressure is monitored by the pressure sensor 71, and the ECU 2 derives the target total braking force based on the monitored master cylinder pressure. On the other hand, in this embodiment, a stroke sensor 32 is provided at the brake pedal 31 to monitor a brake-pedal stroke or a brake-pedal depression amount so that the ECU 2 derives the target total braking force based on the monitored brake-pedal stroke directly.

The other structure is the same as that in the foregoing first preferred embodiment.

[Third Embodiment]

Figure 10:
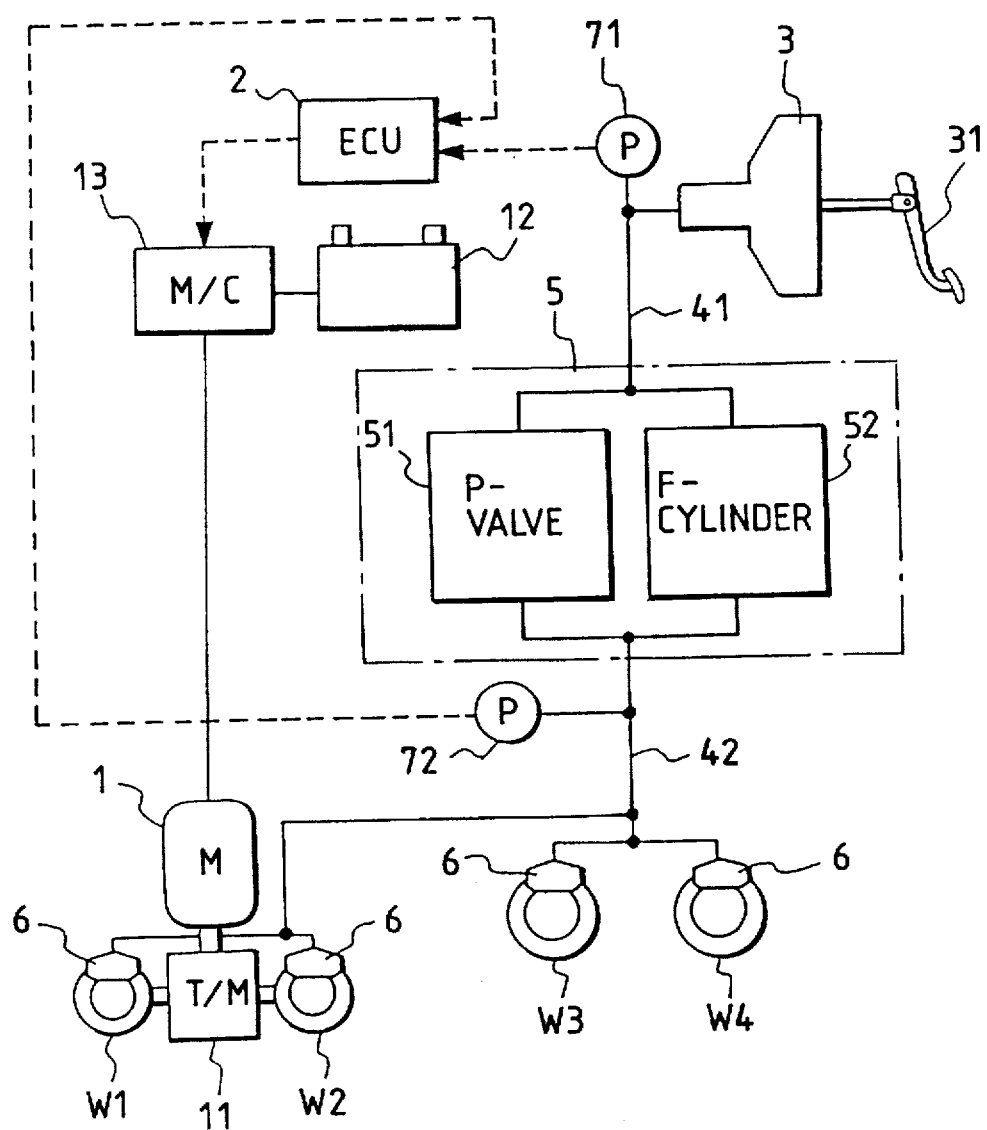
FIG. 10 is a block diagram showing the overall structure of a braking force control system of an electric vehicle according to a third preferred embodiment of the present invention.
Figure 11:
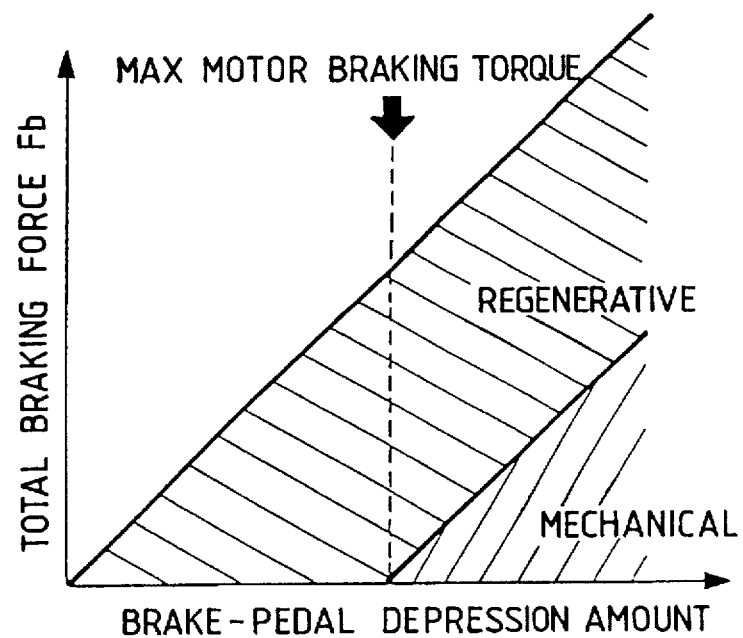
FIG. 11 is a diagram showing a braking force generation characteristic in terms of a brake-pedal depression amount and a total braking force including a regenerative braking force and a mechanical braking force, according to a conventional braking force control system of an electric vehicle.
Figure 12:
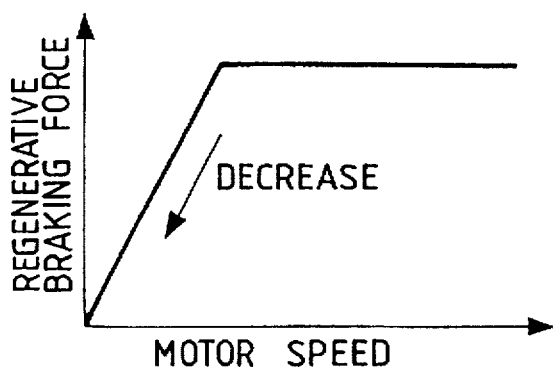
FIG. 12 is a characteristic diagram showing a relationship between a revolution speed of a motor and a regenerative braking force of the motor.
Figure 13:
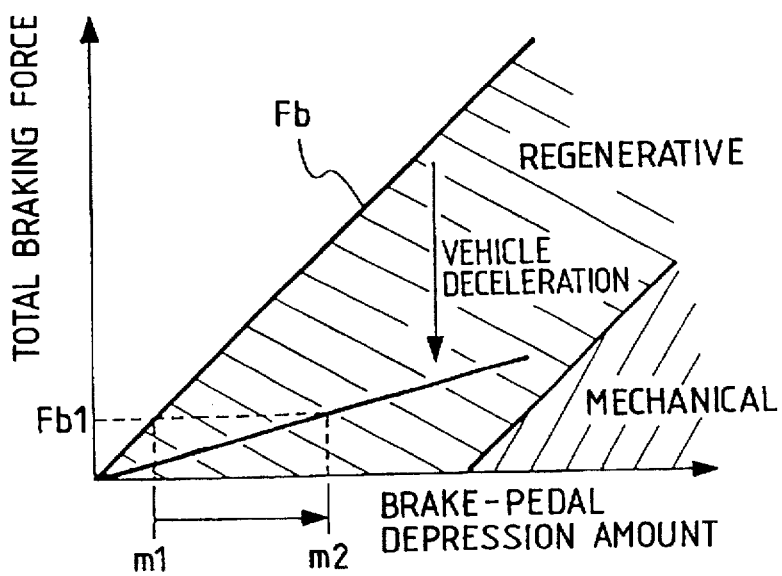
FIG. 13 is a diagram for explaining a braking force generation characteristic when a speed of the vehicle is decreased like just before the vehicle stops, according to the conventional braking force control system of the electric vehicle.

FIG. 10 shows the overall structure of a braking force control system of an electric vehicle according to a third preferred embodiment of the present invention. In FIG. 10, the same or corresponding components are represented by the same symbols as those in FIG. 1.

In this embodiment, the wheel cylinders 6, 6 are further provided at the driven wheels W1 and W2 so as to apply the mechanical braking force to the driven and non-driven wheels.

The other structure is the same as that in the foregoing first preferred embodiment.

In the foregoing preferred embodiments, it is arranged that the wheel cylinder pressure Pw increases by a value which increases at a rate of "1" relative to an increment value of the master cylinder pressure Pro. On the other hand, a different value other than "1" may be selected as such a rate as long as the target total braking force can be properly achieved by the sum of the mechanical braking force and the regenerative braking force. As appreciated from FIGS. 6 and 8, the rate is set to be greater than the foregoing K1 (=(A2−A1)/A2).

As appreciated from the foregoing description, according to the foregoing preferred embodiments, the total braking force includes the mechanical braking force in all the range of brake-pedal depression amounts. Accordingly, even when the motor speed is lowered below the given value to reduce the regenerative braking force of the motor, the required increment of the brake-pedal depression amount for achieving the necessary total braking force can be suppressed as compared with the prior art. Further, in the state where the motor speed is not lowered below such a given value, the regenerative braking force is derived and added to the mechanical braking force so as to achieve the target total braking force derived based on the brake-pedal depression amount. Accordingly, the linear relationship between the total braking force and the brake-pedal depression amount is ensured over all the range of brake-pedal depression amounts. Further, the electrically operated valve used in the prior art for changing the control characteristic of the system is not used in the foregoing preferred embodiments. Accordingly, the higher reliability of the system is ensured as compared with the prior art.

While the present invention has been described in terms of the preferred embodiments, the invention is not to be limited thereto, but can be embodied in various ways without departing from the principle of the invention as defined in the appended claims. For example, the electric vehicle to which the present invention is applied also includes a hybrid car installing an engine, such as a gasoline engine, in addition to the electric drive motor.

What is claimed is:

1. A braking force control system of an electric vehicle comprising:

a regenerative-controllable motor for driving a wheel;

a wheel cylinder for braking a wheel;

a master cylinder connected to a brake pedal for producing a master cylinder pressure in proportion to a depression amount of said brake pedal;

wheel cylinder pressure output means, provided in a working fluid passage from said master cylinder to said wheel cylinder, for receiving the master cylinder pressure from said master cylinder, said wheel cylinder pressure output means outputting to said wheel cylinder a wheel cylinder pressure which increases at a first given rate, being less than 1, relative to the received master cylinder pressure when the depression amount of said brake pedal is no more than a given value, and said wheel cylinder pressure output means outputting to said wheel cylinder the wheel cylinder pressure which increases by an increment value, said increment value increasing at a second given rate, being greater than said first given rate, relative to an increment value of the master cylinder pressure, when the depression mount of said brake pedal is more than said given value;

means for deriving a target total braking force based on the depression mount of said brake pedal;

means for deriving a mechanical braking force based on the wheel cylinder pressure outputted from said wheel cylinder pressure output means; and regenerative braking control means for performing a regenerative control of said motor so as to achieve a regenerative braking force which is equal to a difference between said derived target total braking force and said derived mechanical braking force.

2. The braking force control system according to claim 1, wherein said wheel cylinder pressure output means includes a proportioning valve and a free-piston cylinder provided in parallel with each other in said working fluid passage wherein said proportioning valve outputs the wheel cylinder pressure by reducing the master cylinder pressure at said first given rate in response to the master cylinder pressure no more than a given pressure value, and wherein said free-piston cylinder is opened in response to the master cylinder pressure greater than said given pressure value and outputs the wheel cylinder pressure which increases by said increment value.

3. The braking force control system according to claim 1, wherein said second given rate is 1.

4. The braking force control system according to claim 4, wherein said target total braking force deriving means derives said target total braking force using the master cylinder pressure from said master cylinder, said master cylinder pressure being indicative of the depression amount of said brake pedal.

5.The braking force control system according to claim 1, wherein said wheel cylinder pressure output means outputs said wheel cylinder pressure to said wheel cylinder over all the range of the depression amounts of said brake pedal.

* * * * *